Nov. 15, 1938.  H. G. LOMBARD  2,137,210
SNAP-STUD FASTENING MEANS
Filed March 17, 1937
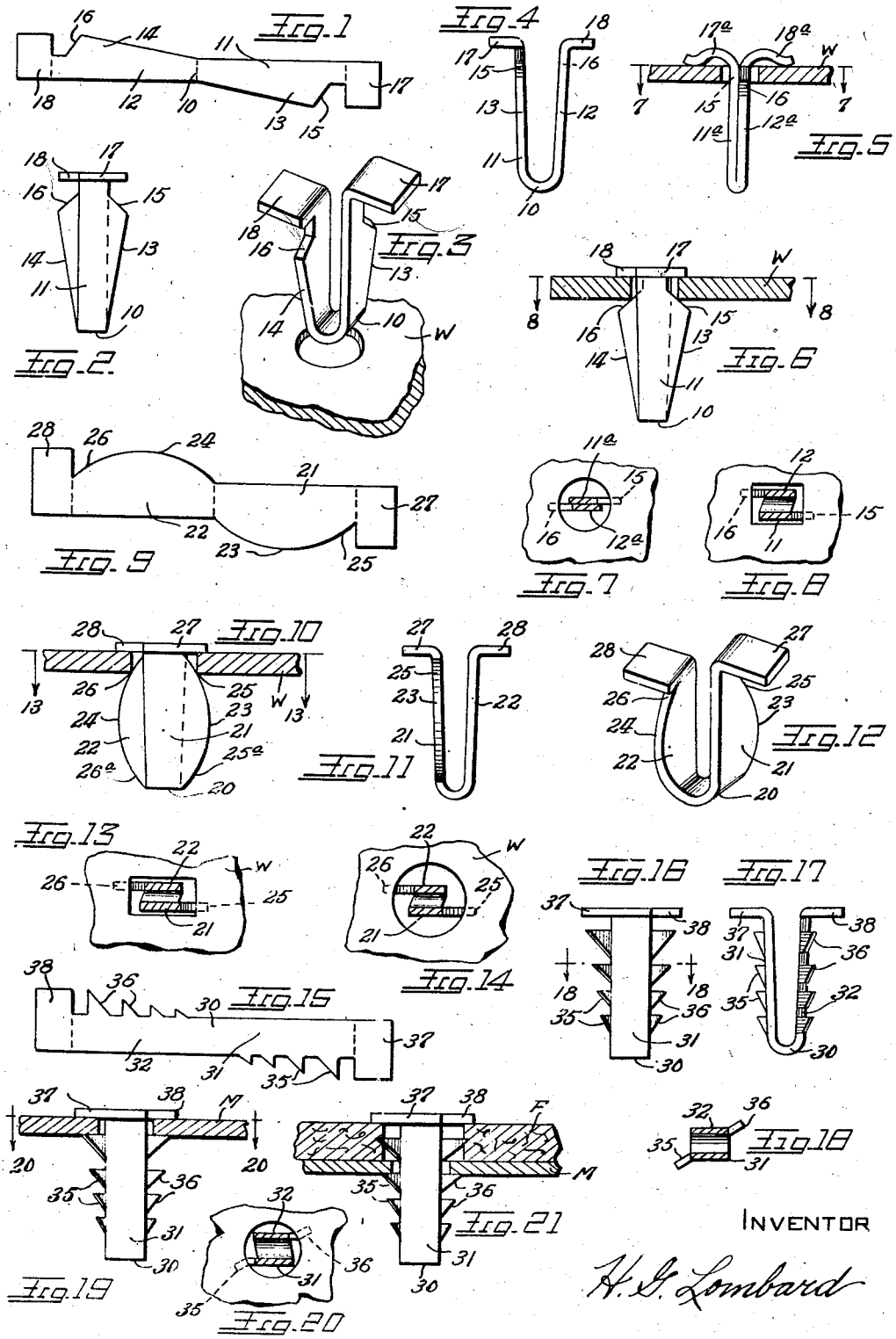
INVENTOR
H. G. Lombard Patented Nov. 15, 1938

2,137,210

UNITED STATES PATENT OFFICE 2,137,210

SNAP-STUD FASTENING MEANS

Herman G. Lombard, Washington, D. C., assignor to Albert H. Tinnerman, Cleveland, Ohio Application March 17, 1937, Serial No. 131,511

6 Claims. (Cl. 85—5).

This invention relates to snap-stud fastening means of general application and of the type constructed from relatively thin material of sheet or strip stock such as sheet spring material, sheet metal, cold rolled metal, flattened wire, or the like.

This application is a continuation in part of a prior co-pending application entitled, "Fastening means", Serial No. 114,825, filed December 8, 1936, since issued as Patent Number 2,077,120, April 13, 1937.

More particularly, the fastening means of this invention comprise various forms of snap-stud devices in which the shank structures consist of cooperating, relatively yieldable leg elements having portions or elements which are out of line, or offset, in normal relation, such as to effect a lateral, relative movement and engagement of the shank legs under tension in fastening position against the side-walls or edges of an aperture in work.

Fastening devices of the type with which this invention deals are constructed of metal sheet material of suitable thickness, usually narrow strip stock, or blank stampings from relatively wide stock. The devices are so constructed as to provide various types of shank structures comprising relatively yieldable leg elements or shank sections, the free ends of the shank sections being suitably elongated and deformed for cooperation with an object to be secured or part to be supported.

In any form of fastening device in which there is obtained a yieldable relation of the shank sections or leg elements, an effective fastening means is provided in that on applying such a device to work in an aperture of less width or diameter than the spacing or overall width of the shank sections, a tension is set up in the shank sections, which tension provides a friction, press fit of the device in fastening position and prevents loosening and accidental removal of the device from such position.

Heretofore, such fastening devices have been used somewhat satisfactorily in installations where no great degree of movement or vibration takes place in the work or members fastened or supported. However, where any degree of strain, jarring or vibration takes place, the shanks of such type of fasteners tend to loosen from their fastening position and eventually become completely removed due to the fact that the sections or elements comprising the shank do not possess sufficient inherent holding power and ability under such conditions.

It is therefore an object of this invention to provide various forms of fastening means and securing devices in which the shanks are composed of relatively yieldable shank elements or leg sections, so disposed with respect to each other as to permit quick easy insertion of the devices into a work aperture by flexing and relative yielding thereof, yet, when in fastening position have such a degree of stiffness, rigidity and tension stored therein through contact and compression against the side walls of the aperture that tension is set up in the shank sections whereby substantial resistance is offered to withdrawal of the devices, and extraordinary resistance is provided against accidental loosening or tendency of the devices moving from applied position due to vibration, jarring or strain set up in the members fastened or in a member to which the device is applied.

It is a further object of this invention to provide various forms and constructions of fastening means and securing devices in which the shanks are composed of relatively yieldable shank sections which are so spaced in normal, untensioned relation as to engage the side walls of the work aperture under compression in applied fastening position, whereby a tension is set up in the shank sections to effect a rigid engagement of the securing devices in such fastening position.

Another object of this invention is to provide snap-stud fastening means comprising leg members substantially oppositely disposed in normal, untensioned relation and provided with means adapted to effect a relative, lateral movement of said leg members to offset, tensioned relation in fastening position.

A further object of the invention is to provide securing devices the shank elements of which are substantially oppositely disposed with respect to each other in normal untensioned relation and are placed under compression in contact with the aperture side walls to seat under tension in fastening position, the said shank sections being provided with integral, projecting or lug means such as shoulders, teeth, or cam surfaces serving to securely engage the work in fastening position and rigidly retain the devices under tension due to a relative contraction, compression, and lateral movement of the shank elements from their initial normal, spaced relation on being applied to a work aperture and advanced to fastening position, whereby an effective seating and locking of the devices in such fastening position is obtained due to the action of the shank sections in attempting to assume their initial, normal substantially oppositely disposed relation.

In the prior co-pending case, above-mentioned, an effective seating of the shank members is obtained by the use of diverging, angularly disposed or laterally offset leg elements which present the longitudinal edges of the legs and/or the elements thereon in out of line, offset relation when untensioned. In the instant case, a similar action is obtained in the shank structures by the use of substantially oppositely disposed leg elements so formed as to present portions thereof in out of line or offset relation in normal, untensioned position such that means on each leg, as, for example, shoulders, abutments, teeth, or the like, project laterally beyond the outline of the cooperating shank leg and effect a relative lateral movement of the shank legs to offset tensioned relation in fastening position in apertured work. The various forms of fastening devices of this invention are advantageous over those of the said prior co-pending case in that they may be more economically manufactured and with the shank legs in such relation at the entering end as to present a substantial pilot element whereby the devices are easily and quickly inserted in an aperture and advanced in the work to become seated under tension in fastening position.

Further objects of the invention will appear as a description thereof proceeds with reference to the accompanying drawing in which like reference characters designate like parts throughout the same and in which:

Fig. 1 represents a blank outline for a form of the device;

Fig. 2 is a side elevation of a completed fastener constructed from the blank of Fig. 1;

Fig. 3 is a perspective view of the device of Fig. 2 about to be applied to an aperture in work;

Fig. 4 is an end elevation of the device shown in Figs. 2 and 3;

Fig. 5 is an end elevation of an alternate construction shown applied to fastening position in work;

Fig. 6 shows the device of Figs. 2 to 5 inclusive as applied to fastening position in a layer of work;

Fig. 7 is a section view taken along line 7—7 of Fig. 5;

Fig. 8 is a section view taken along line 8—8 of Fig. 6;

Fig. 9 represents a blank outline for another form of fastening device;

Fig. 10 shows in side elevation a fastener completed from the blank of Fig. 9 and applied to fastening position in work;

Fig. 11 is an end elevation of the device shown in Fig. 10;

Fig. 12 is a perspective view of the device represented in Figs. 10 and 11;

Fig. 13 is a section view taken along lines 13—13 of Fig. 10 showing the position of the shank legs of the device when applied to a rectangular aperture in work;

Fig. 14 is a similar view showing elements on the shank legs deformed for most effective engagement in a substantially round aperture in work;

Fig. 15 represents a blank outline for a further form of the device;

Fig. 16 is a side elevational view of a device constructed from the blank of Fig. 15;

Fig. 17 is an end elevation of Fig. 16;

Fig. 18 is a section view of Fig. 16 taken along line 18—18;

Fig. 19 shows the device represented in Figs. 16 and 17 as applied to fastening position in a layer of work;

Fig. 20 is a section view of Fig. 19 taken along line 20—20; and

Fig. 21 shows the device of Figs. 16 and 17 as applied for fastening superposed layers of work.

In any of the forms of devices herein disclosed the basic teaching resides in a snap fastener construction in which the legs comprising the shank are disposed substantially opposite each other in normal position, with a leg or each leg being provided with means projecting laterally of its cooperating leg such that when the devices are advanced in a work aperture of less diameter or width than the outer combined overall width of the shank legs, a relative movement of the legs both laterally and toward each other to offset relation is effected, whereupon the device is tensioned or retained in fastening position by the action of shank legs attempting to assume their normal, oppositely disposed relation.

Figs. 1-8 inclusive show a form of the device which may be constructed from a blank such as represented in Fig. 1 in which the intermediate portions 11, 12 comprise the shank of the device when deformed as shown in Figs. 2, 3 and 4. The diagonally opposite edges of the legs are provided with suitable projecting portions 13, 14, Fig. 1, which are disposed laterally beyond the adjacent edge of the cooperating leg as shown in Fig. 2. The projecting edge portions 13, 14 may be provided with suitable recesses spaced from the ends of the blank to present work-engaging shoulders 15, 16 and the end sections 17, 18 may be of suitable length and extend free to be deformed into any desired shape for cooperation with a part to be secured or object to be supported. When bent to desired shape, the blank of Fig. 1 provides a fastening device comprising oppositely disposed, relatively yieldable leg members integrally united in the leading end as shown at 10 to extend in diverging, spaced relation as shown in Fig. 4, or disposed substantially adjacent each other in parallel planes as shown in Fig. 5. In either form, the oppositely disposed leg members present the projecting edge portions 13, 14 in offset relation to the adjacent edge of the cooperating leg as shown in Fig. 2, said leg members, at the leading end 10 of the device, presenting a substantial pilot element of smaller cross section than the size of the opening into which it is applied.

On application to an aperture in work, the leading end 10 of the device, being smaller than the size of the opening, permits the device to be readily inserted and seated in the aperture. As the device is advanced to fastening position the edges of the offset projecting portions 13, 14 serve as guide means causing a gradual relative, lateral contraction of the leg members 11, 12 from their normal position substantially directly opposite each other to a position laterally offset and compressed toward each other. The leg members are thus disposed in tensioned relation and as the device is advanced to the home position shown in Fig. 6, the shoulders 15, 16, become seated against the lower corner edge of the work aperture to rigidly retain the device in applied fastening position under tension of the now offset legs 11, 12, Fig. 8, attempting to assume their normal, oppositely disposed relation. As shown in Figs. 7 and 8 the device is readily adapted for use in either round or rectangular work apertures. When employed in a round aperture the legs 11a, 12a, Fig. 7, may be disposed substantially adjacent each other such as to engage in the work aperture most effectively at substantially diametric points.

The device may be readily withdrawn by moving the head sections 17, 18 or the edge portions 13, 14, Fig. 6, laterally toward each other to an offset relation sufficient to pass the shank elements through the work aperture and thus permit the device to be removed from the work.

In any of the forms of devices herein disclosed, an axial tension on the shank in fastening position may be provided by elongating the free head sections of a device such that they are relatively yieldable with respect to the shank and exert an axial pull on the respective shank legs to adapt the device for various thicknesses of work and snugly retain the device in applied fastening position. Thus, as shown in Fig. 5, the head sections 17a, 18a may be elongated to rest yieldably on the upper face of the work W and cause an axial pull on the shank legs to urge the shoulders 15, 16 thereon into substantially rigid contact with the lower corner edge of the work aperture.

Figs. 9-14 inclusive disclose a form of the device substantially similar in application and use to that described above in connection with Figs. 1-8 inclusive. This form of device may be constructed from a blank such as represented in Fig. 9 in which sections 21, 22 form the shank legs integrally united in the leading end of the device as at 20, and end portions 27, 28 comprise the head member of the device when the blank is bent to the desired form shown in Figs. 10-12 inclusive. The shank legs each carry edge portions projecting beyond the adjacent edge of the cooperating leg, such edge portions being in the form of cam surfaces 23, 24 providing guide surfaces 25a, 26a, tapering toward the leading end of the device to provide a substantial pilot at such end, and work engaging edges 25, 26 converging toward the head members 27, 28. In normal untensioned relation the shank legs 21, 22 are disposed in spaced, diverging relation to the head as in Fig. 11 and substantially opposite each other whereby the edge portion 23, 24, on each leg projects laterally beyond the adjacent longitudinal edge of the opposite cooperating leg. On application of the device to an aperture in work the tapering guide surfaces 25a, 26a cause a gradual, relative, lateral contraction of the shank legs 21, 22 from their normal, untensioned, directly opposite relation to tensioned relation and offset or angularly disposed with respect to each other sufficient to pass the high portions of the cam surfaces 23, 24 of the legs through the work aperture. When seated in home position as shown in Figs. 10, 13, and 14, the legs 21, 22 are maintained in somewhat offset or angularly disposed relation under tension whereby the work engaging shoulders 25, 26 are urged into firm engagement in the work aperture to rigidly seat and maintain the device in applied fastening position. As shown in Figs. 13 and 14 the device is readily adapted for use in either a rectangular or substantially round aperture in work, W.

Fasteners of this form may be readily removed from an installation by axial force exerted on the head sections 27, 28 whereupon the work-engaging edges 25, 26 serve as guide surfaces causing a gradual, relative, lateral contraction of the leg members to an offset relation sufficient to pass the projecting cam portions 23, 24 of the shank legs and permit the device to be withdrawn.

Figs. 15-21 inclusive disclose a further form of shank structure in which the shank legs are provided with series of lug, shoulder or abutment means adapting the device for use in various thicknesses of work. The device may be constructed from a blank such as shown in Fig. 15, the end sections 37, 38 forming the head member and the intermediate sections 31, 32 integrally united as at 30, forming the shank of the device when bent to desired form as shown in Figs. 16 and 17. Along diagonally opposite longitudinal edges of the respective shank legs, lugs, shoulders or abutment means in the form of teeth 35, 36 are provided to project laterally beyond the adjacent edge or outline of the cooperating leg as shown in Fig. 16. In normal, untensioned relation the leg members 31, 32, Fig. 18, are thus disposed directly opposite each other and integrally united in the leading end of the device as at 30 to provide a substantial pilot element facilitating insertion of the device into a work aperture and permitting the same to be readily advanced to fastening position. As the device is advanced in the work aperture, the laterally projecting teeth, or the like, on the legs cam the side walls of the opening to cause a lateral contraction of the leg members 31, 32 from their normal, untensioned position directly opposite each other to a laterally offset relation sufficient to pass the leg members to fastening position. When seated, the legs tend to assume their normal position directly opposite each other whereby a tooth on each leg cooperates to engage the adjacent face of the work to retain the device in fastening position in a layer of work, M, Fig. 19, with the leg members somewhat offset in tensioned relation as shown in Fig. 20. This form of device may be employed in either a round or rectangular aperture in work; however, for most effective engagement in a round aperture the teeth 35, 36 are disposed at an angle to the leg members 31, 32 to engage the work aperture at substantially diametric points as shown in Fig. 20. The same device is readily adapted for use in a plurality of layers of work as shown in Fig. 21, wherein a lower pair of teeth 35, 36 cooperate to engage the underface of metal support M, or the like, to secure a layer of fabric F, thereto.

This form of device may be removed from applied fastening position by moving the head sections 37, 38 to a position approaching alignment whereupon the leg members 31, 32 are disposed in laterally offset relation sufficient to disengage teeth 35, 36 from the work and permit the device to be withdrawn.

While the invention has been described in detail with specific examples, such examples are illustrative only and are not given as limitations, since other modifications within the spirit and scope of the invention will be apparent to those skilled in the art. Hence, the invention is to be understood as limited only as indicated in the appended claims, in which the intent is to set forth all the novelty over the prior art.

What is claimed is:

1. For use in preperforated apertured work, a sheet metal fastening device comprising a blank having a bend at either end thereof to provide a head and a bend intermediate its ends providing a shank of greater length than the thickness of the apertured work to which it is applied, said bend intermediate the ends of the blank being on a line substantially at right angles to the longitudinal axis of the device and providing a shank comprising substantially oppositely disposed leg members of equal length integrally united to provide a leading end for the device, at least one of said leg members having a projecting portion including a shoulder extending laterally beyond the outline of the oppositely disposed leg member when normally untensioned, said projecting portion being adapted to effect relative lateral movement of said oppositely disposed leg members to offset tensioned relation when advanced in the aperture in the work by substantial snap fastening engagement to applied fastening position, said shoulder engaging the adjacent underface of the work under tension in such applied fastening position and cooperating with said head engaging the opposite face of the work to lock the device in its applied fastening position.

2. For use in preperforated apertured work, a sheet metal fastening device comprising a blank having a bend at either end thereof to provide a head and a bend intermediate its ends providing a shank of greater length than the thickness of the apertured work to which it is applied, said bend intermediate the ends of the blank being on a line substantially at right angles to the longitudinal axis of the device and providing a shank comprising substantially oppositely disposed leg members of equal length integrally united to provide a leading end for the device, at least one of said leg members having a projecting portion including a shoulder extending beyond the outline of the oppositely disposed leg member when normally untensioned thereby providing outer longitudinal work engaging edges on said leg members spaced apart a distance greater than the size of the aperture in the work, said longitudinal edges being adapted to effect relative lateral movement of said oppositely disposed leg members to offset tensioned relation when advanced in the aperture in the work by substantial snap fastening engagement to applied fastening position, said shoulder engaging the adjacent underface of the work under tension in such applied fastening position and cooperating with said head engaging the opposite face of the work to lock the device in its applied fastening position.

3. For use in preperforated apertured work, a sheet metal fastening device comprising a blank having a bend at either end thereof to provide a head and a bend intermediate its ends providing a shank of greater length than the apertured part to which it is applied, said bend intermediate the ends of the blank being on a line substantially at right angles to the longitudinal axis of the device and providing a shank comprising substantially oppositely disposed leg members of equal length integrally united to provide a leading end for the device, at least one of said leg members having a projecting portion extending laterally beyond the outline of the oppositely disposed leg member when normally untensioned, said projecting portion including a shoulder and an inclined guide surface adapted to effect relative lateral movement of said oppositely disposed leg members to offset tensioned relation when advanced in the aperture in the work by substantial snap fastening engagement to applied fastening position, said shoulder engaging the adjacent underface of the work under tension in such applied position and cooperating with said head engaging the opposite face of the work to lock the device in its applied fastening position.

4. For use in preperforated apertured work, a sheet metal fastening device comprising a blank having a bend at either end thereof to provide a head and a bend intermediate its ends providing a shank of greater length than the apertured part to which it is applied, said bend intermediate the ends of the blank being on a line substantially at right angles to the longitudinal axis of the device and providing a shank comprising substantially oppositely disposed leg members of equal length integrally united to provide a leading end for the device, said leg members each having a projecting portion extending laterally beyond the outline of the oppositely disposed leg member when normally untensioned thereby providing outer longitudinal edges on said leg members spaced apart a distance greater than the size of the aperture in the work, said longitudinal edges including work engaging shoulders and inclined guide surfaces adapted to effect relative lateral movement of said oppositely disposed leg members to offset tensioned relation when advanced in the aperture in the work by substantial snap fastening engagement to applied fastening position, said shoulders engaging the adjacent underface of the work under tension in such applied fastening position and cooperating with said head engaging the opposite face of the work to lock the device in its applied fastening position.

5. For use in preperforated apertured work, a sheet metal fastening device comprising a blank having a bend at either end thereof to provide a head and a bend intermediate its ends providing a shank of greater length than the apertured part to which it is applied, said bend intermediate the ends of the blank being on a line substantially at right angles to the longitudinal axis of the device and providing a shank comprising substantially oppositely disposed leg members of equal length integrally united to provide a leading end for the device, said leg members each having a projecting portion extending laterally beyond the outline of the oppositely disposed leg member when normally untensioned thereby providing outer longitudinal edges on said leg members spaced apart a distance greater than the size of the aperture in the work, at least one of said longitudinal edges comprising a series of abutments presenting a series of shoulders and inclined guide surfaces adapted to effect relative lateral movement of said oppositely disposed leg members to offset tensioned relation when advanced in the aperture in the work by substantial snap fastening engagement to applied fastening position, one of said shoulders engaging the adjacent underface of the work under tension in such applied fastening position and cooperating with said head engaging the opposite face of the work to lock the device in its applied fastening position.

6. For use in preperforated apertured work, a sheet metal fastening device comprising a blank having a bend at either end thereof to provide a head and a bend intermediate its ends providing a shank of greater length than the apertured part to which it is applied, said bend intermediate the ends of the blank being on a line substantially at right angles to the longitudinal axis of the device and providing a shank comprising substantially oppositely disposed leg members of equal length integrally united to provide a leading end for the device, at least one of said leg members having a projecting portion extending laterally beyond the outline of the oppositely disposed leg member when normally untensioned, said projecting portion including a substantial cam shoulder and inclined guide edge adapted to effect relative lateral movement of said oppositely disposed leg members to offset tensioned relation when advanced in the aperture in the work by substantial snap fastening engagement to applied fastening position, said shoulder engaging the adjacent underface of the work under tension in such applied fastening position and cooperating with said head engaging the opposite face of the work to lock the device in its applied fastening position.

HERMAN G. LOMBARD.